(12) United States Patent
Bunn

(10) Patent No.: US 7,904,357 B2
(45) Date of Patent: Mar. 8, 2011

(54) SYSTEM, METHOD AND APPARATUS FOR MONITORING AND BILLING FOOD PREPARATION EQUIPMENT AND PRODUCT

(75) Inventor: Arthur H. Bunn, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1206 days.

(21) Appl. No.: 10/169,055

(22) PCT Filed: May 21, 2001

(86) PCT No.: PCT/US01/16608
§ 371 (c)(1),
(2), (4) Date: Dec. 9, 2002

(87) PCT Pub. No.: WO01/89318
PCT Pub. Date: Nov. 29, 2001

(65) Prior Publication Data
US 2003/0208419 A1    Nov. 6, 2003

Related U.S. Application Data

(60) Provisional application No. 60/206,049, filed on May 22, 2000.

(51) Int. Cl.
*H04M 15/00* (2006.01)
(52) U.S. Cl. .......................................... 705/34
(58) Field of Classification Search ................ 705/1, 34; 235/381
See application file for complete search history.

(56) References Cited

U.S. PATENT DOCUMENTS

| 3,927,800 | A |   | 12/1975 | Zinsmeyer et al. |
| 4,246,764 | A | * | 1/1981  | Papadakos ...................... 62/183 |
| 4,265,371 | A |   | 5/1981  | Desai et al. |
| 4,295,044 | A |   | 10/1981 | Anderson et al. ............. 250/229 |

(Continued)

FOREIGN PATENT DOCUMENTS

GB    2289971 A    12/1995

(Continued)

OTHER PUBLICATIONS

Clark, Leslie, "It's Temporado Magica Again for Brazilians Visiting Orlando," Orlando Sentinel, Metro Edition, Orlando, FL, May 11, 1998, p. 12.*

(Continued)

*Primary Examiner* — John W Hayes
*Assistant Examiner* — Nathan Erb
(74) *Attorney, Agent, or Firm* — Barnes & Thornburg LLP

(57) ABSTRACT

A system, method and apparatus for monitoring and billing beverage preparation equipment and product. The system includes a controller for monitoring the use of beverage preparation equipment. The beverage preparation equipment or apparatus includes a dilution source and a product source connected to the controller and controllably dispenses a dilution component and product component to mix these two components to produce a resultant combination. Information is provided from the dilution source, product source or both to the controller which relates to the dilution material, product or both used by the apparatus. The information is provided to a data collection portion, also connected to the controller, which uses the information for billing purposes. The method includes a method of billing, servicing and resupplying of the apparatus. Information may be provided to a supplier to periodically deliver a product to the operator of the apparatus.

6 Claims, 1 Drawing Sheet

U.S. PATENT DOCUMENTS

| | | | |
|---|---|---|---|
| 4,412,292 A * | 10/1983 | Sedam et al. ................. 700/241 |
| 4,468,406 A | 8/1984 | d'Alayer de Costemore d'Arc |
| 4,821,921 A | 4/1989 | Cartwright et al. |
| 4,827,426 A * | 5/1989 | Patton et al. .................. 700/240 |
| 4,962,866 A * | 10/1990 | Phillips ............................. 221/8 |
| 5,339,250 A | 8/1994 | Durbin |
| 5,360,140 A | 11/1994 | Senghaas |
| 5,546,444 A | 8/1996 | Roach, Jr. et al. |
| 5,587,089 A * | 12/1996 | Vogel et al. ................... 210/764 |
| 5,590,999 A | 1/1997 | Murphey |
| 5,659,482 A | 8/1997 | Warn et al. |
| 5,730,324 A * | 3/1998 | Shannon et al. ................ 222/61 |
| 5,734,150 A * | 3/1998 | Brown et al. ................. 235/381 |
| 5,769,271 A | 6/1998 | Miller |
| 5,817,231 A * | 10/1998 | Souza .......................... 210/96.2 |
| 5,844,808 A | 12/1998 | Konsmo et al. |
| 5,875,430 A | 2/1999 | Koether |
| 5,941,363 A | 8/1999 | Partyka et al. |
| 5,963,452 A | 10/1999 | Etoh et al. |
| 6,036,055 A | 3/2000 | Mogadam et al. |
| 6,092,693 A | 7/2000 | Powell ............................ 222/59 |
| 6,181,981 B1 | 1/2001 | Varga et al. |
| 6,182,555 B1 * | 2/2001 | Scheer et al. ................... 99/290 |
| 6,250,452 B1 | 6/2001 | Partyka et al. |
| 6,374,845 B1 * | 4/2002 | Melendez et al. ................ 137/3 |
| 6,584,309 B1 | 6/2003 | Whigham |

FOREIGN PATENT DOCUMENTS

| | | | |
|---|---|---|---|
| WO | 0 373 126 | * | 6/1990 |
| WO | WO 90/06565 A | | 6/1990 |
| WO | WO 01/89318 A2 | | 11/2001 |
| WO | WO 01/89318 A3 | | 11/2001 |

OTHER PUBLICATIONS

McKechnie, Beth, "Deciphering the Leasing Game," Manitoba Business, Winnipeg, Apr. 1, 1996, p. 20.*

Bates, James, "It Started With a Bang . . . Sun Valley Firm Hopes Dispenser Will Keep Juice Drink Flowing," Los Angeles Times, Valley Edition, Los Angeles, California, Jul. 1, 1986, p. 5.A.*

Supplemental European search report in European application No. 01939291.9 (Apr. 4, 2007).

* cited by examiner

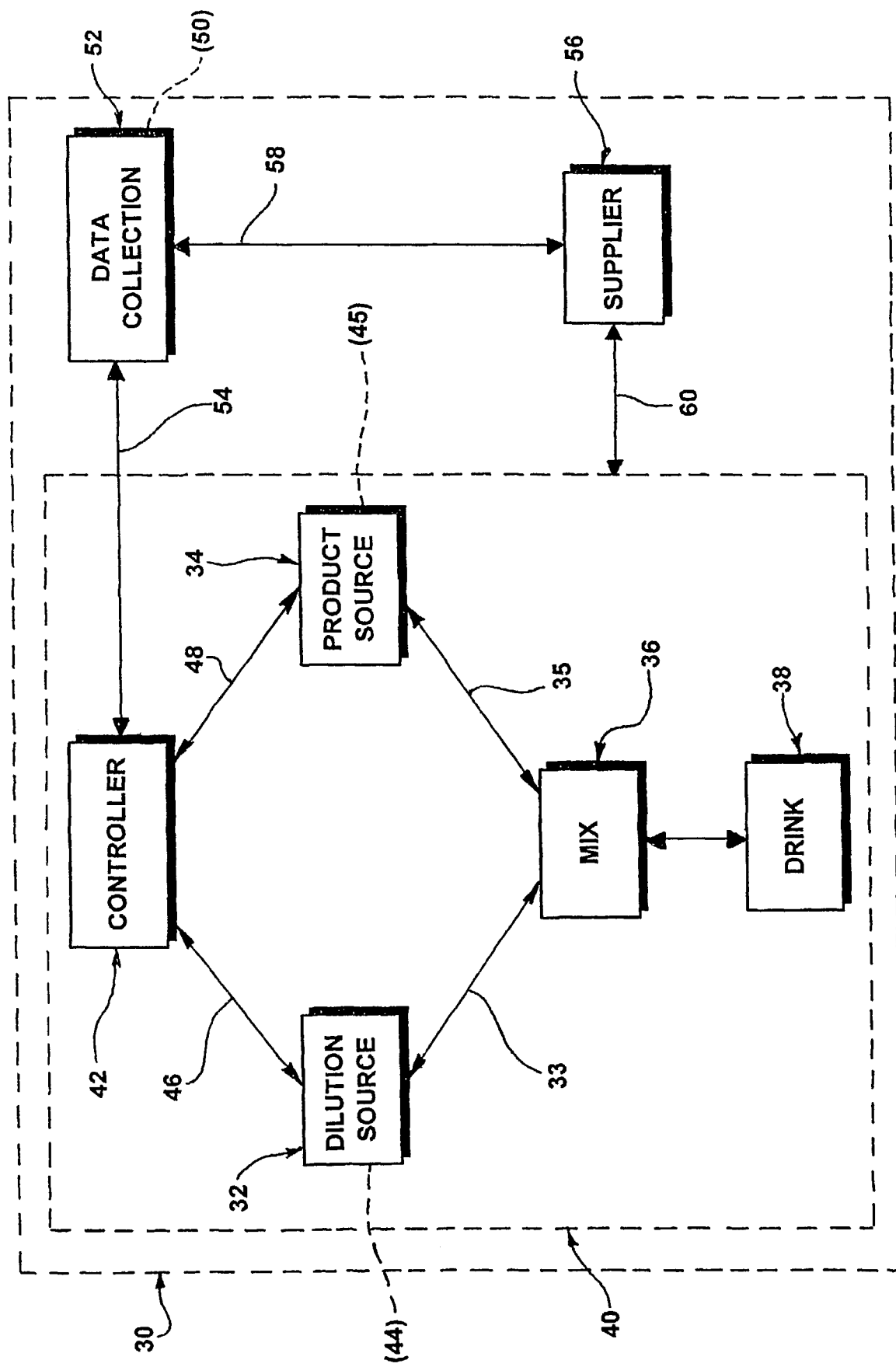

SYSTEM, METHOD AND APPARATUS FOR MONITORING AND BILLING FOOD PREPARATION EQUIPMENT AND PRODUCT

CROSS REFERENCE

This application claims priority under 35 U.S.C. 119 (e) to U.S. Provisional Application Ser. No. 60/206,049, filed May 22, 2000, which is expressly incorporated herein by reference.

BACKGROUND

The present invention relates to food preparation or dispensing product component, such as powdered concentrate, with a dilution component, such as water, to form a resultant combination, such as a beverage.

A variety of food preparation or dispensing apparatus are available in which a product such as a food concentrate or food base is combined or otherwise mixed with water or another liquid. In this regard, most beverages as well as other liquid food substances such as soups are not ready to drink and are prepared by mixing water, either hot or cold with such a product. For example, there are numerous devices which combine powdered or liquid concentrate coffee products with water to produce a reconstituted or mixed coffee beverage having a desired flavor. Similarly, some fountain-type beverage devices may be capable of dispensing carbonated beverages as well as juice or other non-carbonated beverages by mixing a syrup or powdered beverage product with carbonated or non-carbonated water to produce a diluted or reconstituted beverage.

One of the methods of doing business in the area of beverage preparation equipment and product sales is for the beverage equipment supplier or the product supplier to provide the equipment operator with the beverage preparation equipment at little or no cost by way of a no cost or low cost loan arrangement. In this scenario the supplier retains ownership of the equipment. The supplier sells the product used with the loaned equipment at a higher price than the price solely for the product if the operator owned the equipment. This allows the supplier to recover the cost of the loaned equipment over a period of time through the higher priced product. In other words, the business method involves loaning the equipment to the operator, with the agreement that the operator will purchase its product requirements from the supplier. The scenario typically requires that the equipment supplier maintain ownership and control of the equipment so that it can be transferred back to the equipment supplier in the event that the operator ceases to purchase product from the supplier, or goes out of business or other circumstance which requires return of the equipment to the supplier.

One of the problems for the equipment supplier is that another companies' product or concentrate could be purchased by the operator for use in the equipment supplier's equipment. Such a situation occurs and often results in a considerable loss of revenue for the supplier. Moreover, such switching of the product or concentrate by the operator can occur without the knowledge of the equipment supplier.

In the foregoing description the equipment provider may be an equipment manufacturer as well as another party such as the producer or supplier of the product concentrate. Examples of operators are restaurants, convenience stores, hotels, motels, stadiums and other entertainment facilities, health care facilities and other large institutional settings. Moreover, it should be noted that many of these types of operators may be members of a franchise arrangement which makes it difficult if not impossible in many situations to precisely monitor the type of concentrate being used in the equipment. With this in mind, the equipment supplier is left to trust or explicitly contract with the operator to avoid the operator from switching to an alternative, perhaps cheaper cost and lower quality concentrate product. Moreover, if the situation is managed by contract, the equipment supplier must be prepared to enforce the contract in the event of a switch in concentrate by the operator which could damage or terminate the relationship between the supplier and operator.

As an additional concern, the equipment supplier often wishes to maintain a particular quality associated with the beverage equipment. In this regard, a well-recognized, high-end equipment manufacturer would prefer to have some ability to control if not assure the quality of the beverages produced by its equipment. This oftentimes directly relates to the quality of the product concentrate used in the equipment. As such, if a cheaper, less expensive and lower quality product is used in the equipment, a poor resultant combination or beverage could impact negatively on the image and reputation of the equipment manufacturer.

With the foregoing in mind, the present invention seeks to improve and provide a novel system, method and apparatus for monitoring, controlling and billing beverage preparation equipment and product.

OBJECTS AND SUMMARY OF THE INVENTION

An object of the invention is to provide a novel system for monitoring the use of beverage preparation equipment.

Another object of the invention is to provide a novel system for billing relating to the use of beverage preparation equipment.

A further object of the invention is to provide a novel system for maintaining resultant drink characteristics.

Yet a further object of the invention is to provide a novel system for monitoring various characteristics relating to beverage preparation equipment and product.

An object of the invention is to provide a novel business method for monitoring the use of beverage preparation equipment.

Another object of the invention is to provide a novel business method for billing relating to the use of beverage preparation equipment.

A further object of the invention is to provide a novel business method for maintaining resultant drink characteristics.

Yet a further object of the invention is to provide a novel business method for monitoring various characteristics relating to beverage preparation equipment and product.

An object of the invention is to provide a novel apparatus for monitoring the use of beverage preparation equipment.

Another object of the invention is to provide a novel apparatus for billing relating to the use of beverage preparation equipment.

A further object of the invention is to provide a novel apparatus for maintaining resultant drink characteristics.

Yet a further object of the invention is to provide a novel apparatus for monitoring various characteristics relating to beverage preparation equipment and product.

The present invention envisions a system, method and apparatus for monitoring and billing beverage preparation equipment and product. The system includes a device for monitoring the use of beverage preparation equipment. The beverage preparation equipment or apparatus includes a dilution source and a product source which controllably dispense dilution material and product to mix these two components to produce a desired drink. Information is provided from the dilution source, product source or both to the controller which relates to the quantity of dilution component or water, product component or both used by the apparatus. The information is provided to a data collection portion which uses the information for billing purposes. The method includes a method of billing the use of the apparatus, the product or both in relation to the quantity of water, product or both used by the apparatus. Information may be provided to a supplier to periodically deliver a product to the operator of the apparatus.

Additional features and advantages of the invention will become apparent to those skilled in the art upon consideration of the following detailed description and preferred embodiments exemplifying the best mode of carrying out the invention as presently perceived.

BRIEF DESCRIPTION OF THE DRAWINGS

FIG. 1 is a diagrammatic illustration of the present invention.

DESCRIPTION

While the present invention may be susceptible to embodiment in different forms, there is shown in the drawings, and herein will be described in detail, an embodiment thereof with the understanding that the present description is to be considered an exemplification of the principles of the invention and is not intended to limit the invention to that as illustrated and described herein.

With reference to the diagrammatic illustration of FIG. 1, a system 30 is shown which employs a method which uses the system 30. The system 30 includes food dispensing equipment or apparatus 40, also referred to herein as mixing and dispensing apparatus 40, which in turn includes a dilution source 32 and a product source 34. The dilution source 32 primarily provides a dilution material or component 33 to the system 30. The product source 34 provides a beverage product or component 35 to the system 30.

It should be noted that the dilution material 33 may be water as well as any number of other dilution materials 33. For example, while water primarily may be used as a dilution material 33 in beverage or food product preparation as described herein, it is anticipated that other dilution materials 33 such as milk, carbonated water and other beverage or food bases might be used. Moreover, the devices embodying the dilution source 32 used to dispense dilution material 33 could be any one of a variety of pumps, controllable valves or other controllable dispensing devices. There are many forms of equipment which may be used as the dilution source 32 and it is expect that one skilled in the art and familiar with such beverage technology will be able to provide apparatus to provide the functions of the dilution source 32 without undue experimentation. Reference herein will be made to the dilution source 32 dispensing water as the dilution material 33 with the understanding that the terms dilution source 32 and dilution material 33 are to be broadly defined and are not intended to be limiting.

Similarly, the product source 34 is considered to be broadly defined and interpreted and includes any number of products 35. The products 35 are primarily concentrated or reduced forms of beverages, drinks, food products as well as any number of other products 35. Such products, when combined or mixed 36 with water dispensed from the dilution source 32, and mixed at a predetermined ratio form a properly prepared resultant combination 38. While it is expected that any number of beverages, drinks, food mixtures or combinations 38 could result, reference is made hereinbelow to the combination as being a drink or beverage with the understanding that the use of this term is not limiting. The term drink or beverage is also intended to be broadly interpreted. The product source 34 may dispense any number of products such as juice concentrates, soda syrups, ground coffee, tea leaves, powdered concentrates such as coffee, tea, juices, soups and other beverages or food products such as potatoes and sauces. Moreover, the devices used to dispense product 35 could be any one of a variety of pumps, auger dispensers, gravity feed dispensers or other controllable dispensing devices. Reference is made herein to the terms product source 34 and product 35 with the understanding that these terms are to be broadly defined and interpreted.

An example of equipment which combines a dilution source 32 and product source 34 is the Fresh Mix Dispenser (FMD) manufactured and sold by Bunn-O-Matic Corporation of Springfield, Ill. The FMD equipment controllably dispenses powdered food product 35 for mixing with water 33 to produce a resultant combination 38.

The dilution source 32 and product source 34 are part of an apparatus 40 which includes a controller 42 to controllably dispense predetermined quantities of the dilution material 33 and product 35 to be mixed 36 to form the drink 38. As shown in FIG. 1, the mixing step and/or apparatus 36 combines dilution material 33 and product 35. In the form of a step, the water is mixed with the product to produce the drink. As an apparatus, the mixer 36 may controllably mechanically combine the dilution material and product such as by means of a motorized whipping device or other agitating device.

Consistent with the broad definitions provided herein with regard to the dilution material and product, the drink may take the form of a finished, mixed, combined food product such as a coffee beverage, soup, carbonated beverage, juice, potatoes or sauces. In general, the drink is a food product which results from the mixing of the two components of which at least the dilution material 33 is generally a liquid. In order to further illustrate the broad definitions used herein, it is anticipated that the dilution source 32 may provide dilution material 33 in many forms ranging from a near-freezing or freezing state such as an ice or a slush material to a vaporous or nearly-vaporous state, for example steam, in order to produce the desired drink 36.

As shown in FIG. 1, the system 30 includes the controller 42. As will be described in greater detail herein, in one embodiment the dilution source 32 includes a device such as a flow meter, sensor or other device 44 which is used in the monitor and control of the flow of the dilution water 33. The device 44 is capable of monitoring the flow of dilution water 33 either directly or inferentially. The controller 42 controls the dilution source 32 over line or communication path 46. The device 44 provides information to the controller 42 over line or communication path 46.

As will be discussed in greater detail herein, the product source 34 includes a device such as a flow meter, sensor or other device 45 which is used in the monitor and control of the flow of the product 35. The device 45 is capable of monitoring the flow of product 35 either directly or inferentially. The controller 42 controls the product source 34 over line or communication path 48. The device 45 provides information to the controller 42 over line or communication path 48. The controller 42 also captures information relating to the quantity of the of the dilution component 33 and product component 35 dispensed over communication paths 46, 48.

Lines 46 and 48 may be multiple line conductors or single line conductors, such conductors being of an electrically or optically conductive media, as well as wireless connections. If wireless technology is used, lines 46 and 48 represent communication paths and not physical connections and the associated wireless communication devices in order to provide the wireless communication path. Such lines 46, 48 are of generally known construction and include all equivalents which might be developed. The descriptions of communication paths 46, 48 are to be broadly defined and interpreted.

The controller 42 and data collection portion 52 may be equipped with an appropriate communication device 50 such as a modem or global positioning and communication device. The communication device 50 may be an integrated device or a stand alone device which works with the other aspects of the controller 42. The communication device 50 may be a single device or multiple devices and is provided to permit communication of information from the controller 42 to the data collection portion 52 regardless of and about the location of the apparatus 40. For example, a modem might be provided in combination with a global positioning device or such a device may be provided as a single device. The controller 42, data collection portion 52, and communication device 50 are of generally known construction and include all equivalents which might be developed. The descriptions of the controller 42, data collection portion 52 and communication device 50 are to be broadly defined and interpreted. The communication device 50 may be connected to the Internet to communicate information about the apparatus 40.

The flow control device or flow meter 44 may be positioned in various locations in the apparatus 40 to achieve a desired result. For example, a single flow meter 44 can be placed at the inlet to the entire apparatus 40 so that the total water usage by the apparatus 40 is monitored and reported to the controller 42. Alternatively, in a beverage brewing device, the flow meter 44 can be placed at the dispensing outlet of a heated water reservoir which leads to a brewing system so that only the water used to brew is monitored. In the previous example, some brewing systems may include separate dispensing spigots for dispensing hot water only and thus would not be included in the calculation of the cost, described herein, relating to the present invention.

Furthermore, multiple flow meters 44 can be placed relative to individual dispensing heads of a multiple dispensing apparatus 40 to record the amount and type dispensed from each head. It should be noted that the flow meter 44 can be used on a pressurized water line, as well as a line in a gravity feed, pour-in basin system. With this in mind, the flow meter 44 as described above can be used in individual serving apparatus, as well as batch serving apparatus such as coffee brewing systems which brew a multiple cup volume.

Similar to the flow control device 44 describes herein, the device 45 may be positioned in various locations in the apparatus 40 to achieve a desired result. It should be noted that the flow control devices 44, 45 may be used individually, together, or as a means to provide redundant checking of the system. In other words, it is envisioned that the system may be operated using a flow control device 44 or a device 45. The system also may be embodied to use both devices 44, 45. Further, the system may be configured and include programming to rely on one of the devices 44, 45 to provide primary information regarding the use of the apparatus 40 with the other of the two devices 44, 45.

In the embodiment which uses a device 45 associated with the product source 34, the dispensing of the product 35 can be monitored by positioning the device 45 on a pump used to dispense liquid product or auger motor used to dispense powdered product 35. Also, the device 45 can be positioned at an outlet 62 of the product source 34 to monitor the actual outflow. As such, this is another example of the inferential or actual monitoring of the product flow. Furthermore, multiple devices 45 can be placed relative to individual product dispensers associated with the product source 34 of a multiple dispensing apparatus to record the amount and type of product dispensed.

The system 30 provides communication between the mixing and dispensing apparatus 40 of the system 30 and a data collection portion 52 of the system 30. Generally, the data collection portion 52 receives information from the mixing and dispensing apparatus 40 over line 54. As previously discussed with reference to lines 46, 48, the line 54 may be a single or multiple, electrically conductive or optically conductive line, as well as a wireless communication path between the controller 42 and the data collection portion 52. Line 54 may be a single path to transfer information to the data collection portion 52 or may be a two-way path which allows the data collection portion 52 to query, confirm or otherwise communicate with the controller 42.

Generally, the controller 42 provides information to the data collection portion 52 including at least the quantity and/or flow rate of the water 33, product 35 or both 33, 35 monitored by the device 44 of the dilution source 32 and/or the device 45 of the product source 34. Generally, the controller 42 is in the form of a microprocessor of known construction and includes a memory device. As such, the information may be stored at the controller 42 until accessed or automatically forwarded to the data collection portion 52.

Using the present system 30 and the apparatus 40 associated therewith, the resultant combination 38 is reconstituted or mixed at a predetermined ratio of dilution component 33 to product 35. The ratios can be established, adjusted, and set for desired characteristics such as established brand flavor profiles, regional taste preferences and other characteristics. Generally, once the ratio of water 33 to product 35 is established to achieve the desired characteristics, these ratios or flow rates provide specific, determinable, repeatable and calibratable target levels or ranges. Because the ratio is constant, the accuracy and precision can be used, at least in part if not in whole, to determine the number of drinks served or the total amount of finished product served based on the flow rate of the water 33 from the water source 32. Once again, the dilution component 33 may be a carbonated, non-carbonated or other liquid source, for example, milk. Regardless of the source of the dilution component 33, the flow rate of the diluting component 33 can be set and reset and established as a repeatable limit or range.

Once the data collection portion 52 has obtained the information from the controller 42, it may be used for a variety of applications. The flow rate information, since it is generally a constant ratio relative to the quantity of product dispensed by the product source 34, may provide information relating to ordering of the product. For example, the information provided by the flow meter 44 or device 45 to the controller 42 can be used to record the flow rate or quantity, time of day, frequency over various periods of time as well as type of beverage dispensed. This information may be used to develop maintenance schedules, service schedules, product usage tracking (quantity, type, time of day) as well as for other purposes relating to, for example, marketing. More specifically, in a system 30 information 46 can be used to calculate when water filters must be replaced. In this situation when necessary a water filter may be provided automatically by the supplier in response to the information 46. This information, combinations thereof, or selected portions thereof, is valuable business information which may be studied to determine patterns, trends and other analytical information.

The information can also be transmitted to or accessed by a supplier 56 on a regular basis as indicated by line 58. Such information can be used to establish a schedule by which an appropriate quantity of product 35 is automatically delivered to the operator to maintain the apparatus 40 based on the historical accumulated information provided by the controller 42. Communication line 58 may be a two-way communication line such that the data collection portion 52 communicates the ordering requirements to the supplier and the supplier provides confirmation and, perhaps, billing information to the data collection portion 52. The supplier 56 can then provide products 35 as well as additional information to the operator of the apparatus 40 as indicated by communication path 60. Communication line 60 may be a two-way communication line. For example, the supplier 56 may provide product to the operator of the apparatus 40 and may also communicate the order information, confirmation and, perhaps, billing information. The operator of the apparatus 40 may also provide information to the supplier via communication path 60 including confirmation of receipt of the product and the products received.

The present invention includes a business method in which an equipment supplier can provide an operator with a beverage mixing and dispensing apparatus 40. The equipment supplier and operator enter into an arrangement which generally includes the communication 54 of information from the controller 42 of the apparatus 40 to the data collection portion 52. The information provided to the data collection portion 52 includes at least flow rate information whether in the form of dilution material flow rate, product flow rate or both. As noted above, the flow rate may be the actual flow rate or the inferential flow rate. In accordance with the arrangement between the parties billing information can be calculated based on the flow rate information.

The equipment 40 can be provided to the operator with or without specific charge. The information from the dilution source 32, the product source 34 or both can be used to calculate billing rates or costs for the apparatus 40 and the product 35 without separately charging for the product. As such the product component 35 can be provided without specific charge to the operator. The sale of product 35 to the operator of the apparatus 40 as provided by the supplier 56 can be calculated based on the water flow rate. It should be noted, based on the broad definitions above, that the dilution material 33 may also be provided by the supplier 56. However, this situation generally occurs when the dilution material is not water since water may be easily supplied by the operator.

Applying this business method, in which the operator pays a charge for the equipment 40 and the product 35 or for example the system 30, the operator of the apparatus 40 would gain little or no advantage by purchasing product 35 from an alternate source since the operator would be paying for the system 30, including the product 35, based on the water 33 usage, product 35 usage or both calculated as quantity or servings dispensed. If the product 35 is included in the pricing calculation, purchasing of product 35 from an alternate source would be additional cost and therefore a disincentive to using any product 35 except that provided by the data collection source 52.

As a result of this business method, information 58 from the data collection source 52 can be used to control the type and quality of the drink 38 produced by the operator of the apparatus 40. Additionally, the operator of the apparatus 40 would have no incentive to alter the concentration or dilution ratio of the product 35 and as such, the drink 38 produced by the apparatus 40 would be relatively predictably consistent.

It should be noted that the data collection portion 52 may or may not be located at and/or operated by the original supplier of the apparatus 40. The data collection portion 52 may actually be a subunit of an entity which purchases and loans such apparatus 40 or manufacturers such apparatus. Additionally, the supplier 56 may be part of the same entity as the data collection portion 52 or may be a separate entity outside of the other entities which produces the product. It should be noted that only a single supplier 56 is shown in FIG. 1. It should also be noted that multiple suppliers might be used to accommodate the variety of products which might be used in a multiple product apparatus. For example, a system could include a carbonated beverage dispenser, a brewed beverage dispenser, a soup drink dispenser and a juice beverage dispenser. As such, multiple suppliers may be needed to provide the multiple product types such as soda water and syrup, ground or whole bean coffee, powdered soup or drink mixes and liquid beverage concentrates, used in such a system.

With the foregoing in mind, it will also be appreciated that although a single data collection portion 52 is shown and a single apparatus 40 is shown, it is conceivable that multiple data collection portions 52 and multiple apparatus 40 may be provided. For example, if a franchise entity has multiple apparatus 40 in each of many locations, a single data collection portion 52 may be dedicated for such a franchise. Additional dedicated data collection portions 52 may be provided for other franchises, as well as other individual non-franchise operators. The diagrammatic illustration provided herein are illustrative of one of the fundamental embodiments of the present invention as generally describe herein.

Although the invention has been described in detail with reference to preferred embodiments, variations and modifications exist within the scope and spirit of the invention as described and defined in the following claims.

I claim:

1. A billing method for a loaning of food dispensing equipment which selectively combines at least one food product component with a dilution component for producing a resultant combination, the billing method comprising:
    providing an equipment operator with the food dispensing equipment for placement to allow use of the food dispensing equipment by an end user to dispense the resultant combination of the food product component and the dilution component;
    providing a product source of the food dispensing equipment for controllably dispensing the food product component by the end user;
    providing a dilution source connected to the food dispensing equipment for controllably dispensing the dilution component in relation to dispensing of the food product component for producing the resultant combination, with the dilution component being provided by the equipment operator;
    providing a controller of the food dispensing equipment for controllably operating the product source and the dilution source;
    monitoring, by the controller, operation of the dilution source;
    capturing, by the controller, information from the monitoring, by the controller, operation of the dilution source including an amount of the dilution component dispensed; and
    billing, by a data collection portion, the equipment operator for the loaning of the food dispensing equipment and a providing of the food product component, without separately charging for the food product component, based on the amount of the dilution component dispensed and not based on an amount of the food product component dispensed;

wherein the equipment operator and the end user are not the same party.

2. The billing method of claim 1, the billing method further comprising the step of: providing the dilution component in the form of water provided by the equipment operator; and billing the equipment operator based on an amount of the water dispensed by the dilution source.

3. The billing method of claim 2, the billing method further comprising the step of transmitting information relating to at least one of the amount of the dilution component dispensed and the amount of the food product component dispensed, to the data collection portion.

4. A billing method for use by a supplier for a loaning of a beverage dispensing equipment, the billing method comprising:

providing an equipment operator with the beverage dispensing equipment which selectively combines at least one product component with water for producing a resultant beverage upon use by an end user;

providing a product source of the beverage dispensing equipment for controllably dispensing the product component;

providing a water source connected to the beverage dispensing equipment for controllably dispensing the water to the beverage dispensing equipment with the water being provided by the equipment operator;

providing a controller of the beverage dispensing equipment for controllably operating the product source and the water source;

monitoring, by the controller, operation of the water source for determining usage of the beverage dispensing equipment;

capturing, by the controller, information from the monitoring, by the controller, operation of the water source including an amount of the water dispensed by the water source; and billing, by a data collection portion, the equipment operator for the loaning of the beverage dispensing equipment and a providing of the product component, without separately charging for the product component, based on the amount of the water dispensed by the water source and not based on an amount of the product component dispensed;

wherein the equipment operator and the end user are not the same party.

5. The billing method of claim 4, the billing method further comprising the step of providing the product component in the form of a liquid concentrate.

6. A system for dispensing food comprising:

a controller comprising:
a processor; and
a memory, communicatively coupled to the processor; and a data collection portion, communicatively coupled to the controller;

wherein the system is configured to perform a method comprising:

controllably operating, by the controller, a food product source of a food dispensing equipment and a dilution source of the food dispensing equipment such that a food product component dispensed by the food product source and a dilution component dispensed by the dilution source are combined to produce a resultant combination;

monitoring, by the controller, operation of the dilution source;

capturing, by the controller, information from the monitoring, by the controller, operation of the dilution source, including an amount of the dilution component dispensed;

transmitting, by the controller, the information including the amount of the dilution component dispensed to the data collection portion; and billing, by the data collection portion, an equipment operator for a loaning of the food dispensing equipment to the equipment operator and a providing of the food product component, without separately charging for the food product component, based on the amount of the dilution component dispensed and not based on an amount of the food product component dispensed.

* * * * *